United States Patent
Imai et al.

(10) Patent No.: US 12,208,367 B2
(45) Date of Patent: Jan. 28, 2025

(54) ACTIVATED CARBON FIBER SHEET FOR MOTOR VEHICLE CANISTER

(71) Applicant: NIPPON PAPER INDUSTRIES CO., LTD., Tokyo (JP)

(72) Inventors: Daisuke Imai, Tokyo (JP); Yoshihide Watanabe, Tokyo (JP); Yuu Takata, Tokyo (JP); Shunsuke Ozawa, Tokyo (JP); Chie Yoshida, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 354 days.

(21) Appl. No.: 17/667,209

(22) Filed: Feb. 8, 2022

(65) Prior Publication Data
US 2022/0161229 A1    May 26, 2022

Related U.S. Application Data

(63) Continuation of application No. PCT/JP2020/031505, filed on Aug. 20, 2020.

(30) Foreign Application Priority Data

Aug. 21, 2019  (JP) ................... 2019-151379
Jan. 16, 2020  (JP) ................... 2020-004865

(51) Int. Cl.

| B01J 20/20 | (2006.01) |
|---|---|
| B01D 53/04 | (2006.01) |
| B01J 20/28 | (2006.01) |
| C01B 32/318 | (2017.01) |
| D01F 9/16 | (2006.01) |
| D06C 7/04 | (2006.01) |
| F02M 25/08 | (2006.01) |

(52) U.S. Cl.
CPC .......... *B01J 20/20* (2013.01); *B01D 53/0415* (2013.01); *B01J 20/28011* (2013.01); *B01J 20/28033* (2013.01); *B01J 20/28066* (2013.01); *B01J 20/28071* (2013.01); *B01J 20/28073* (2013.01); *B01J 20/28076* (2013.01); *B01J 20/2808* (2013.01); *B01J 20/28083* (2013.01); *C01B 32/318* (2017.08); *D01F 9/16* (2013.01); *D06C 7/04* (2013.01); *B01D 2253/102* (2013.01); *B01D 2253/306* (2013.01); *B01D 2253/308* (2013.01); *B01D 2253/311* (2013.01); *B01D 2259/4516* (2013.01); *B01J 2220/42* (2013.01); *B01J 2220/66* (2013.01); *D10B 2401/10* (2013.01); *D10B 2505/12* (2013.01); *F02M 25/0854* (2013.01); *F02M 2200/9046* (2013.01)

(58) Field of Classification Search
CPC ........... B01D 53/04; B01J 20/20; B01J 20/28; C01B 32/318
See application file for complete search history.

(56) References Cited

U.S. PATENT DOCUMENTS

| 6,099,609 | A | 8/2000 | Lira et al. |
|---|---|---|---|
| 11,642,433 | B2 | 5/2023 | Fujiki et al. |
| 2003/0032556 | A1 | 2/2003 | Ouvry |
| 2006/0141256 | A1 | 6/2006 | Ishikawa et al. |
| 2006/0145382 | A1 | 7/2006 | Huang et al. |
| 2007/0021300 | A1* | 1/2007 | Farant ............... B01J 20/20 |
| | | | 502/430 |
| 2009/0080142 | A1 | 3/2009 | Nanba et al. |
| 2009/0218292 | A1 | 9/2009 | Mitchell et al. |
| 2010/0212496 | A1 | 8/2010 | Hanamoto et al. |
| 2012/0063627 | A1 | 3/2012 | Takashima et al. |
| 2015/0032069 | A1 | 1/2015 | Ko et al. |
| 2016/0166802 | A1 | 6/2016 | Ko et al. |
| 2021/0198111 | A1 | 7/2021 | Imai et al. |
| 2022/0161229 | A1 | 5/2022 | Imai et al. |
| 2023/0390732 | A1 | 12/2023 | Imai et al. |

FOREIGN PATENT DOCUMENTS

| JP | 55-107056 | 8/1980 |
|---|---|---|
| JP | 58-91360 | 5/1983 |
| JP | 62-152534 | 7/1987 |
| JP | 4-265461 | 9/1992 |
| JP | 5-103979 | 4/1993 |
| JP | 2007-186403 | 7/2007 |

(Continued)

OTHER PUBLICATIONS

JP-2007186403-A Translation (Year: 2006).*
International Search Report issued Nov. 10, 2022 in International (PCT) Application No. PCT/JP2020/031505.
Written Opinion of the International Searching Authority issued Nov. 10, 2020 in International (PCT) Application No. PCT/JP2020/031505.
Office Action issued Apr. 14, 2020 in Japanese Application No. 2020-004865 with English translation.
Office Action issued Aug. 18, 2020 in Japanese Application No. 2020-004865 with English translation.
Office Action and Search Report issued Mar. 18, 2021 in Taiwanese Application No. 109128125 with partial English translation.

(Continued)

*Primary Examiner* — Sharon Pregler
(74) *Attorney, Agent, or Firm* — Wenderoth, Lind & Ponack, L.L.P.

(57) ABSTRACT

A problem to be solved by the present invention is to provide a new form of adsorbent suitable for a motor vehicle canister. An activated carbon fiber sheet satisfies one or two or more of conditions for indices, such as a specific surface area, a pore volume of pores having a given pore diameter, and a sheet density. An embodiment, for example, may have: a specific surface area ranging from 1400 to 2300 m²/g; a pore volume ranging from 0.20 to 0.70 cm³/g for pores having pore diameters of more than 0.7 nm and 2.0 nm or less; an abundance ratio $R_{0.7/2.0}$, which is a ratio of a pore volume of micropores having pore diameters of 0.7 nm or less occupied in a pore volume of micropores having pore diameters of 2.0 nm or less, ranging from 5% to less than 25%, and a sheet density ranging from 0.030 to 0.200 g/cm³.

9 Claims, No Drawings

(56) References Cited

FOREIGN PATENT DOCUMENTS

| | | | |
|---|---|---|---|
| JP | 2007186403 A * | 7/2007 | ........... C01B 32/342 |
| JP | 2013-173137 | 9/2013 | |
| JP | WO2019/117029 | 6/2019 | |
| TW | I276720 | 3/2007 | |
| TW | 201932182 | 8/2019 | |
| WO | 2004/099073 | 11/2004 | |
| WO | 2004/110928 | 12/2004 | |

OTHER PUBLICATIONS

Extended European Search Report issued Oct. 27, 2023 in corresponding European Patent Application No. 20853673.0.

International Preliminary Report on Patentability and Written Opinion of the International Searching Authority issued Feb. 17, 2022 in International (PCT) Application No. PCT/JP2020/031505.

Office Action issued May 22, 2024, in U.S. Appl. No. 17/667,064.

International Search Report issued Oct. 27, 2020 in International (PCT) Application No. PCT/JP2020/031503.

Written Opinion of the International Searching Authority issued Oct. 27, 2020 in International (PCT) Application No. PCT/JP2020/031503.

Jo Anne G. Balanay, et al., "Morphologic and Surface Characterization of Different Types of Activated Carbon Fibres", Adsorption Science & Technology, 2012, vol. 30, No. 4, pp. 355-367.

Extended European Search Report issued Dec. 11, 2023 in European Patent Application No. 20855575.5.

Office Action and Search Report issued May 7, 2021 in Taiwanese Application No. 109128122 with partial English translation.

International Preliminary Report on Patentability issued on Feb. 17, 2022 in International (PCT) Patent Application No. PCT/JP2020/031503.

Superpose, American Heritage Dictionary of the English Language, Fifth Edition. 2016 by Houghton Mifflin Harcourt Publishing Company. https://www.thefreedictionary.com/superposed (Year: 2016).

* cited by examiner

ACTIVATED CARBON FIBER SHEET FOR MOTOR VEHICLE CANISTER

CROSS-REFERENCE TO RELATED APPLICATIONS

This application is based upon and claims the benefits of priorities from Japanese Patent Application No. 2019-151379, filed Aug. 21, 2019; Japanese Patent Application No. 2020-004865, filed Jan. 16, 2020; and International Application No. PCT/JP2020/031505, filed Aug. 20, 2020, the entire contents of which are incorporated herein by reference.

TECHNICAL FIELD

The present invention relates to activated carbon fiber sheets and particularly relates to activated carbon fiber sheets suitable for use in motor vehicle canisters.

BACKGROUND ART

Gasoline-powered vehicles release fuel vapor that has filled their fuel tanks due to change of pressure in the fuel tanks with changes, such as changes in outside air temperature. The released fuel vapor is considered to be one of substances causing PM2.5 or photochemical smog. Canisters including adsorbents, such as activated carbon, have been provided to prevent the release of the fuel vapor into the atmosphere. (Hereinafter, in this Description, a canister mounted in a motor vehicle may simply be referred to as a "motor vehicle canister" or more simply a "canister.")

With the recent increase in awareness for environmental conservation, gas emission regulations tend to be tightened year by year, and there is thus a demand for canisters to have higher adsorption performance. In addition, intake performance of motor vehicles tends to be reduced due to the spread of systems including start-stop systems, and gasoline adsorbed by adsorbents in their canisters thus tends to be difficult to be desorbed. Therefore, there is a demand for adsorbents used in canisters to have higher performance. Activated carbon is used as an adsorbent used in canisters, and has been proposed to be formed into granular shapes, powdery shapes, or honeycomb shapes (for example, Patent Literature 1).

CITATION LIST

Patent Literature

Patent Literature 1: Japanese Patent Application Laid-open No. 2013-173137

SUMMARY OF INVENTION

Technical Problem

Activated carbon fiber (or fibrous activated carbon) may be referred to as the third activated carbon in contrast with conventional powdered, granular, or pelletized activated carbon. Activated carbon fiber is said to be relatively large in specific surface area, large in adsorption capacity, and high in rate of adsorption and desorption, among different forms of activated carbon in a broad sense. However, activated carbon fiber has not been put to practical use in canisters, and research and development have not advanced sufficiently as to characteristics of activated carbon fiber suitable for practical use in canisters.

In view of the foregoing, a problem to be solved by the present invention is to provide a new form of adsorbent suitable for motor vehicle canisters.

Solution to Problem

Inventors of the present invention have conducted research diligently and have found out that: in motor vehicle canisters, adsorbents need to be fixed not to be worn away due to vibration, for example; and a sheet formed of activated carbon fiber is suitable for practical use in terms of ease of handling, for example. However, the inventors have found out that demanded performance per unit volume of a canister in a motor vehicle is difficult to be achieved simply by placement of the activated carbon fiber sheet in the housing of the canister, due to the limited volume of the canister. As a result of further diligent research, the inventors have found out that an activated carbon fiber sheet suitable for motor vehicle canisters is able to be provided by the following means, and have completed the present invention.

[1] An activated carbon fiber sheet for a motor vehicle canister, comprising:
  a specific surface area ranging from 1400 $m^2/g$ to 2300 $m^2/g$;
  a pore volume $V_{0.7-2.0}$ that is a volume for pores having pore diameters larger than 0.7 nm and equal to or smaller than 2.0 nm, the pore volume $V_{0.7-2.0}$ ranging 0.20 $cm^3/g$ to 0.70 $cm^3/g$;
  an abundance ratio $R_{0.7/2.0}$ that is a ratio of a pore volume of micropores having pore diameters of 0.7 nm or less occupied in a pore volume of micropores having pore diameters of 2.0 nm or less, the abundance ratio $R_{0.7/2.0}$ ranging from 5% to less than 25%, and
  a sheet density ranging from 0.020 $g/cm^3$ to 0.200 $g/cm^3$.

[2] The activated carbon fiber sheet for a motor vehicle canister according to the above item [1], wherein a total pore volume of the activated carbon fiber sheet ranges from 0.60 to 1.20 $cm^3/g$.

[3] The activated carbon fiber sheet for a motor vehicle canister according to the above item [1] or [2], wherein the activated carbon fiber sheet is a carbonized product of cellulosic fiber.

[4] A motor vehicle canister, comprising: the activated carbon fiber sheet for a motor vehicle canister according to any one of the above items [1] to [3].

Advantageous Effects of Invention

An embodiment of the present invention enables provision of an activated carbon fiber sheet that is easily handled, has high adsorption-desorption performance for a low concentration, and is suitable for canisters of motor vehicles.

Furthermore, an embodiment of the present invention enables provision of a motor vehicle canister having excellent adsorption-desorption performance for a low concentration.

DESCRIPTION OF EMBODIMENTS

Embodiments of the present invention will be described hereinafter. Unless otherwise specified, the phrase "ranging from AA to BB" means "being in the range of AA or more and BB or less" (where "AA" and "BB" represent arbitrary numerical values). The units for the lower and upper limits are the same as those appended immediately after the latter (i.e., "BB" here), unless otherwise noted.

1. Activated Carbon Fiber Sheet for Motor Vehicle Canisters

An activated carbon fiber sheet for a motor vehicle canister of the present invention is a product in the form of a sheet made of activated carbon fiber, and is suitably used as an adsorbent to be stored in a canister mounted in a motor vehicle. (Hereinafter, the activated carbon fiber sheet for a motor vehicle canister of the present invention may simply be referred to as the activated carbon fiber sheet of the present invention.) The activated carbon fiber sheet of the present invention meets at least one condition or any combination of two or more conditions of given conditions described below.

Specific Surface Area

The lower limit of specific surface area of the activated carbon fiber sheet of the present invention may be preferably 1400 m$^2$/g or more, more preferably 1500 m$^2$/g or more, and even more preferably 1600, 1700, or 1800 m$^2$/g or more.

In general, while the activated carbon fiber sheet of the present invention is preferably large in specific surface area in terms of adsorption performance, the upper limit of specific surface area for the activated carbon fiber sheet may be approximately 2300, 2200 or 2100 m$^2$/g or less.

Setting the specific surface area in the above range enables the sheet to have more excellent adsorption-desorption performance for fuel vapor.

Total Pore Volume

The lower limit of total pore volume of the activated carbon fiber sheet of the present invention may be preferably 0.50 cm$^3$/g or more, more preferably 0.60 cm$^3$/g or more, and even more preferably 0.70, 0.75 or 0.80 cm$^3$/g or more.

The upper limit of total pore volume of the activated carbon fiber sheet of the present invention may be preferably 1.20 cm$^3$/g or less, more preferably 1.10 cm$^3$/g or less, and even more preferably 1.05 or 1.00 cm$^3$/g or less.

Setting the total pore volume in the above range enables the sheet to have more excellent adsorption-desorption performance for fuel vapor.

Average Pore Size (Average Pore Diameter)

With respect to the present invention, the term "pore size" refers to a diameter or width of the pore, not the radius of the pore, unless otherwise explicitly stated.

The lower limit of average pore diameter of the activated carbon fiber sheet of the present invention may be preferably 1.69 nm or more, more preferably 1.70 nm or more, and even more preferably 1.72, 1.75, 1.78, or 1.80 nm or more.

The upper limit of average pore diameter of the activated carbon fiber sheet of the present invention may be arbitrary, but may be preferably 4.00 nm or less, more preferably 3.50 nm or less, and even more preferably 3.00, 2.80, 2.60, 2.40, or 2.20 nm or less.

Setting the average pore diameter in the above range enables the sheet to have more excellent adsorption-desorption performance for fuel vapor.

Ultramicropore Volume: $V_{0.7}$

Concerning the present invention, the term "ultramicropore" means a pore having a pore diameter of 0.7 nm or less.

The lower limit of ultramicropore volume of the activated carbon fiber sheet of the present invention may be preferably 0.10 cm$^3$/g or more, more preferably 0.12 cm$^3$/g or more, and even more preferably 0.13 or 0.14 cm$^3$/g or more.

The upper limit of ultramicropore volume of the activated carbon fiber sheet of the present invention may be preferably 0.30 cm$^3$/g or less, more preferably 0.26 cm$^3$/g or less, and even more preferably 0.24, 0.22, or 0.20 cm$^3$/g or less.

Setting the ultramicropore volume in the above range enables the sheet to have more excellent adsorption-desorption performance for fuel vapor.

Micropore Volume: $V_{2.0}$

Concerning the present invention, the term "micropore" means a pore having a pore diameter of 2.0 nm or less.

The lower limit of micropore volume of the activated carbon fiber sheet of the present invention may be preferably 0.45 cm$^3$/g or more, more preferably 0.50 cm$^3$/g or more, and even more preferably 0.55, 0.60, 0.63, or 0.65 cm$^3$/g or more.

The upper limit of micropore volume of the activated carbon fiber sheet of the present invention may be preferably 1.00 cm$^3$/g or less, more preferably 0.90 cm$^3$/g or less, and even more preferably 0.85 or 0.80 cm$^3$/g or less.

Setting the micropore volume in the above range enables the sheet to have more excellent adsorption-desorption performance for fuel vapor.

Pore Volume of Pore Having Pore Diameter Larger Than 0.7 nm and Equal to or Less Than 2.0 nm: $V_{0.7\text{-}2.0}$ A pore volume $V_{0.7\text{-}2.0}$ of pores having pore diameters larger than 0.7 nm and equal to or smaller than 2.0 nm is able to be determined by Equation 1 below using a value "a" of ultramicropore volume and a value "b" of micropore volume.

$$V_{0.7\text{-}2.0} = b - a \qquad \text{(Equation 1)}$$

In the activated carbon fiber sheet of the present invention, the lower limit of the pore volume $V_{0.7\text{-}2.0}$ for the pores having the pore diameters larger than 0.7 nm and 2.0 nm or smaller may be preferably 0.20 cm$^3$/g or more, more preferably 0.30 cm$^3$/g or more, and even more preferably 0.40 or 0.45 cm$^3$/g or more.

In the activated carbon fiber sheet of the present invention, the upper limit of the pore volume $V_{0.7\text{-}2.0}$ for the pores having the pore diameters larger than 0.7 nm and equal to or smaller than 2.0 nm may be preferably 1.20 cm$^3$/g or less, more preferably 1.00 cm$^3$/g or less, and even more preferably 0.90, 0.80, 0.75, 0.70, 0.68, or 0.65 cm$^3$/g or less.

Setting the pore volume $V_{0.7\text{-}2.0}$ in the above range enables the sheet to have more excellent adsorption-desorption performance for fuel vapor.

Abundance Ratio of Volume of Ultramicropores Occupied in Volume of Micropores: $R_{0.7/2.0}$ An abundance ratio $R_{0.7/2.0}$, which is a ratio of the ultramicropores having pore diameters of 0.7 nm or less occupied in the pore volume of the micropores having pore diameters of 2.0 nm or less, is able to be determined by Equation 2 below using a value "a" of the ultramicropore volume and a value "b" of the micropore volume.

$$R_{0.7/2.0} = a/b \times 100(\%) \qquad \text{(Equation 2)}$$

In the activated carbon fiber sheet of the present invention, the lower limit of the abundance ratio $R_{0.7/2.0}$ of the ultramicropore volume occupied in the micropore volume may be preferably 5% or more, more preferably 8% or more, and even more preferably 10, 13, or 15% or more.

In the activated carbon fiber sheet of the present invention, the upper limit of the abundance ratio $R_{0.7/2.0}$ of the ultramicropore volume occupied in the micropore volume is less than 25% as one embodiment, and may be preferably 24% or less, more preferably 23% or less, and even more preferably 22% or less.

Setting the above-mentioned ultramicropores volume abundance ratio $R_{0.7/2.0}$ in the above range enables the sheet to have more excellent adsorption-desorption performance for fuel vapor.

Basis Weight (Weight Per Unit Area

The lower limit of basis weight of the activated carbon fiber sheet of the present invention may be preferably 30 g/m² or more, more preferably 35 g/m² or more, and even more preferably 37 or 40 g/m² or more.

The upper limit of basis weight of the activated carbon fiber sheet of the present invention may be preferably 400 g/m² or less, more preferably 380 g/m² or less, and even more preferably 360, 350, 340, or 330 g/m² or less.

Setting the basis weight in the above range enables the sheet to have more excellent adsorption-desorption performance demanded for use in the canister within a range of volume of adsorbent that is able to be stored in the canister.

Sheet Thickness

The lower limit of sheet thickness of the activated carbon fiber sheet of the present invention may be preferably 0.3 mm or more, more preferably 0.5 mm or more, and even more preferably 1.0 mm or 1.5 mm or more.

The upper limit of sheet thickness of the activated carbon fiber sheet of the present invention may be preferably 8.0 mm or less, more preferably 7.0 mm or less, and even more preferably 6.0, 5.0, 5.5, 4.0, 3.5 or 3.0 mm or less.

Setting the sheet thickness in the above range enables the sheet to have more excellent adsorption-desorption performance demanded for use in the canister within a range of volume of adsorbent that is able to be stored in the canister.

Sheet Density

The lower limit of density of the activated carbon fiber sheet of the present invention may be preferably 0.020 g/cm³ or more, more preferably 0.022 g/cm³ or more, and even more preferably 0.024, 0.026, 0.028, or 0.030 g/cm³ or more.

The upper limit of sheet density of the activated carbon fiber sheet of the present invention may be preferably 0.200 g/cm³ or less, more preferably 0.190 g/cm³ or less, and even more preferably 0.180, 0.170, 0.0160, or 0.150 g/cm³ or less.

Setting the sheet density in the above range enables the sheet to have more excellent adsorption-desorption performance per volume demanded for the canister within a range of volume of adsorbent that is able to be stored in the canister.

Tensile Strength (MD: Machine Direction)

The lower limit of tensile strength (MD) of the activated carbon fiber sheet of the present invention may be preferably 0.005 kN/m or more and more preferably 0.007 kN/m or more, and even more preferably 0.009 kN/m.

The upper limit of tensile strength (MD) of the activated carbon fiber sheet of the present invention is not particularly limited and may be arbitrary, and may be preferably 2.50 kN/m or less, more preferably 2.00 kN/m or less, and even more preferably 1.50, 1.25, 1.00, 0.75, or 0.50 kN/m or less.

Setting the tensile strength (MD) in the above range enables the sheet to have flexibility. It is therefore possible to provide an absorbent that has excellent workability, is difficult to be damaged, and is able to be easily handled in operation including placement of the adsorbent into a canister.

Tensile Strength (CD: Cross Direction)

The lower limit of tensile strength (CD) of the activated carbon fiber sheet of the present invention may be preferably 0.005 kN/m or more, more preferably 0.007 kN/m or more, and even more preferably 0.009 kN/m or more.

The upper limit of tensile strength (CD) of the activated carbon fiber sheet of the present invention is not particularly limited and may be arbitrary, and may be preferably 2.50 kN/m or less, more preferably 2.00 kN/m or less, and even more preferably 1.50, 1.25, 1.00, 0.75, or 0.50 kN/m or less.

Setting the tensile strength (CD) in the above range enables the sheet to have flexibility. It is therefore possible to provide an absorbent that has excellent workability, is resistant to damage, and is able to be easily handled in operation including placement of the adsorbent into a canister.

Moisture Content

The activated carbon fiber sheet of the present invention preferably has a given moisture content. For example, the lower limit of water content at 23° C. and a relative humidity of 50% may be preferably 1% or more, more preferably 2% or more, and even more preferably 3% or more.

Furthermore, the upper limit of the water content at 23° C. and a relative humidity of 50% may be preferably 25% or less, more preferably 22% or less, and even more preferably 15 or 10% or less.

Setting the water content in the above range under the above conditions enables the sheet to be more excellent as an adsorbent for motor vehicle canisters.

Methylene Blue Adsorption Performance

The activated carbon fiber sheet of the present invention preferably has, as an adsorbent, given methylene blue adsorption performance. The methylene blue absorption performance is able to be represented as an amount of adsorbed methylene blue per activated carbon fiber sheet weight. The methylene blue adsorption performance of the activated carbon fiber sheet of the present invention may be preferably 60 ml/g or more, more preferably 70 ml/g or more, and even more preferably 80, 90, or 100 ml/g.

N-Butane Adsorption-Desorption Performance

The activated carbon fiber sheet of the present invention preferably has, as an adsorbent, given n-butane adsorption-desorption performance. The n-butane adsorption-desorption performance serves as an index of adsorption-desorption performance for vapor; therefore, any adsorbent having excellent n-butane adsorption-desorption performance is suitable for use in motor vehicle canisters. The n-butane adsorption-desorption performance is able to be represented as an effective amount of adsorbed n-butane per activated carbon fiber sheet weight. The effective amount of adsorbed n-butane per activated carbon fiber sheet weight is an amount of adsorbed n-butane in adsorption that is repeated subsequently to desorption of n-butane from the adsorbent under predetermined desorption conditions after sufficient absorption breakthrough of n-butane on the adsorbent.

Preferred embodiments of the activated carbon fiber usable in the present invention may have an effective adsorption-desorption amount of n-butane (an average of the second adsorption amount and the second desorption amount) that is preferably 3.00 wt % or more, more preferably 4.00 wt % or more, and even more preferably 5.00 wt % or more. The effective adsorption-desorption amount of n-butane is determined according to a measurement method described with respect to Examples below.

Furthermore, preferable embodiments of the activated carbon fiber usable in the present invention may have an effective adsorption-desorption ratio of n-butane that is preferably 20.0% or more, more preferably 25.0% or more, and even more preferably 30.0, 35.0, or 40.0%. The effective adsorption-desorption ratio of n-butane is determined according to a measurement method described with respect to Examples below.

For example, the activated carbon fiber with such n-butane adsorption performance may be suitably employed in the form of activated carbon fiber sheets.

Combinations of Preferable Conditions

The activated carbon fiber sheet of the present invention meets at least one or any combination of two or more of the above-described conditions related to its physical properties or performance. Preferred examples of these combinations will be described below. The activated carbon fiber sheet of the present invention is not limited to the following combinations.

Sheet of Embodiment 1

An activated carbon fiber sheet for a motor vehicle canister satisfying the following conditions (1) to (4).

(1) Its specific surface area ranges from 1400 to 2300 $m^2/g$.

(2) Its pore volume $V_{0.7-2.0}$, which is a volume of pores having pore diameters larger than 0.7 nm and equal to or smaller than 2.0 nm, ranges from 0.20 to 0.70 $cm^3/g$.

(3) Its abundance ratio $R_{0.7/2.0}$, which is a ratio of the ultramicropores having pore diameters of 0.7 nm or less occupied in the pore volume of the micropores having pore diameters of 2.0 nm or less, ranges from 5% or more to less than 25%.

(4) Its sheet density ranges from 0.020 to 0.200 $g/cm^3$.

Fuel vapor is a main target to be adsorbed onto the adsorbent for motor vehicle canisters. The above-described specific surface area and pore volume $V_{0.7-2.0}$ are preferably satisfied in terms of adsorption performance for fuel vapor.

Furthermore, motor vehicle canisters are limited in size and the above-mentioned condition (4) related to the sheet density is preferably satisfied for obtainment of the adsorbable amount by use of the activated carbon fiber sheet. The activated carbon fiber sheet may be formed by carbonization of a raw material that is a fiber sheet and thus generally tends to be somewhat bulky and low in density. In order to meet the above-mentioned condition (4), the activated carbon fiber sheet may be subjected to treatment, such as pressure treatment, in its manufacturing process, to be compacted.

As described above, the sheet of Embodiment 1 is in a suitable form in terms of adsorption performance and adsorption capacity demanded for motor vehicle canisters.

Sheet of Embodiment 2

An activated carbon fiber sheet for a motor vehicle canister satisfying the following condition (5), in addition to the conditions (1) to (4) according to the Embodiment 1.

(5) Its total pore volume is 0.60 to 1.20 $cm^3/g$.

Satisfying the above condition (5) as well as the above conditions of (1) to (4) enables the sheet made into a more preferable embodiment from the viewpoint of ensuring the adsorption capacity required for canisters.

2. Canister

The activated carbon fiber sheet of the present invention is suitable as an adsorbent stored in a motor vehicle canister. That is, the present invention enables provision of a motor vehicle canister that is another embodiment.

The motor vehicle canister of the present invention has the activated carbon fiber sheet as an adsorbent. The motor vehicle canister has a structure that is not particularly limited, and may have any general structure. For example, the motor vehicle canister may be a motor vehicle canister having the following structure.

A canister including:
   a housing;
   an adsorbent chamber storing therein the adsorbent in the housing;
   a first inlet-outlet to connect between the adsorbent chamber and an engine and allow gas to be sent into or sent out from the adsorbent chamber;
   a second inlet-outlet to connect between the adsorbent chamber and a fuel tank and allow gas to be sent into or sent out from the adsorbent chamber; and
   a third inlet-outlet to open in response to application of a given pressure to the third inlet-outlet from the adsorbent chamber or from outside air, connect between the adsorbent chamber and the outside air, and allow gas to be sent into or release from the adsorbent chamber.

A preferable canister has a structure such that the gas passes through the adsorbent sufficiently as the gas moves between each of inlet-outlets in the canister. The arrangement of these inlet-outlets is not particularly limited. For example, an embodiment may be to provide the first and second inlet-outlets on the first side of the housing and provide the third inlet-outlet on the second side facing the first side. Another embodiment may be to provide each of inlet-outlets on the same side. There is no restriction on the orientation of the surface on which the inlet-outlets are provided, and they may face any surface, such as the top, bottom, or side, when equipped in a car.

The adsorbent chamber may have more than one room. For example, the adsorbent chamber may be divided into two or more sections by partition walls. The partition walls to be used may be porous plates having gas permeability. Furthermore, an additional adsorbent room may be equipped by provision of an external second housing separately from the first housing so that the first and the second housings are connected to each other via a gas passage. If plural sections or housings are provided as described above, according to a preferred embodiment, the adsorbent or the adsorbent chamber may be provided so that adsorption capacities in these sections or housings decrease one by one from the direction of an inlet-outlet for fuel vapor (the direction of the first inlet-outlet) to the direction of an outside air opening (the direction of the second inlet-outlet). Specifically, for example, according to this preferred embodiment, a composite canister may have a main canister (a first housing) and a second canister (a second housing) that is additionally provided to the main canister and is nearer to the outside air opening than the main canister is. A high performance canister is able to be provided with reduced cost when plural sections or housings are provided as described above, the high performance canister having: a main body (a first section or a first housing) with the largest storage capacity; and a second or later section or housing with a relatively smaller storage capacity. This main body is a section or housing nearest to an inlet-outlet for fuel vapor and stores therein conventional and lower-cost activated carbon. The second or later section or housing stores therein the active carbon fiber sheet of the present invention which has excellent adsorption-desorption performance for a low concentration.

When there is more than one adsorbent chamber, fuel vapor flowing, from a preceding layer, into an adsorbent chamber nearer to the outside air opening has become lower in concentration. Therefore, the activated carbon fiber sheet of the present invention, which has high n-butane adsorption performance for a low concentration of about 0.2%, is suitable as an adsorbent to be stored in a second or later section or housing located nearer to the outside air opening.

In the case where the activated carbon fiber sheet of the present invention is used in the adsorbent chamber nearer to the outside air opening, the amount of leakage of fuel vapor upon stoppage of the motor vehicle for a long time is able to be reduced since the effective amount of adsorption-desorption by the activated carbon fiber sheet of the present invention through purging thereof is large. The activated carbon fiber sheet of the present invention is thus also suitable as an adsorbent to be used in a motor vehicle canister.

Therefore, preferred embodiments of the canister include, for example, the following embodiments.

A motor vehicle canister comprising two or more adsorbent chambers, wherein a second or subsequent adsorbent chamber/chambers provided nearer to an outside air opening than a first adsorbent chamber provided nearest to a fuel vapor inlet-outlet stores/store therein the activated carbon fiber sheet of the present invention.

Furthermore, according to a preferred embodiment, the active carbon fiber sheet may serve as an active carbon fiber sheet for the second or subsequent adsorbent chamber/chambers in the motor vehicle canister having the two or more adsorbent chambers.

In the above embodiments, the number of the adsorbent chambers may be two or more. If the number of the adsorbent chambers is three or more, the activated carbon fiber sheet of the present invention may be stored in at least one of these adsorbent chambers that is after the second adsorbent chamber.

3. Method of Manufacturing Activated Carbon Fiber Sheet

The above-described activated carbon fiber sheet of the present invention is manufactured so as to satisfy conditions selected from the above-described given conditions. The activated carbon fiber sheet of the present invention is able to be made, for example, as follows.

One preferred embodiment of a method of manufacturing the activated carbon fiber sheet of the present invention (hereinafter, referred to as "Embodiment 1 of manufacturing method") includes:

carbonizing and activating a raw material sheet holding one or both of a phosphoric acid-based catalyst and an organic sulfonic acid-based catalyst; and adjusting a density of the activated carbon fiber sheet to be of 0.030 to 0.200 g/cm$^3$.

3-1. Preparation of Raw Material Sheet (Precursor)

Type of Fiber

Examples of fiber forming the raw material sheet include cellulosic fiber, pitch-based fiber, PAN-based fiber, phenol resin-based fiber, and preferably include cellulosic fiber.

Cellulosic Fiber

The cellulosic fiber refers to fiber composed mainly of cellulose and/or a derivative thereof. Origins of cellulose and cellulose derivatives may be any one or more of examples including chemically synthesized products, plant derived cellulose, regenerated cellulose, and cellulose produced by bacteria. Examples of the cellulosic fiber preferably used include fiber formed of a plant cellulose material obtained from plants, such as trees, and fiber formed of a long fibrous regenerated cellulose material obtained by dissolution of a plant cellulose material (such as cotton or pulp) through chemical treatment. In addition, the fiber may contain components, such as lignin and/or hemicellulose.

Examples of raw materials for the cellulosic fiber (the plant cellulose material or regenerated cellulose material) may include: plant cellulose fiber, such as cotton (such as short fiber cotton, medium fiber cotton, long fiber cotton, super long cotton, and ultra super long cotton), hemp, bamboo, kozo, mitsumata, banana, and tunicates; regenerated cellulose fiber, such as cuprammonium rayon, viscose rayon, polynosic rayon, and cellulose made from bamboo; purified cellulose fiber spun by use of organic solvent (N-methylmorpholine N-oxide); and acetate fiber, such as diacetate and triacetate. In terms of availability, a preferred one or preferred ones of these examples is/are at least one selected from cuprammonium rayon, viscose rayon, and purified cellulose fiber.

Diameters of monofilaments forming the cellulosic fiber range from 5 to 75 μm, and the density of the monofilaments ranges from 1.4 to 1.9 m$^3$/g.

Embodiments of the cellulosic fiber are not particularly limited, and according to purposes, the cellulosic fiber prepared into a form, such as raw yarn (unprocessed yarn), false twisted yarn, dyed yarn, single yarn, folded yarn, or covering yarn, may be used. When the cellulosic fiber includes two or more kinds of raw materials, the cellulosic fiber may be, for example, blended yarn or blended twisted yarn. Furthermore, the above-mentioned raw materials in various forms may be used alone or in combination of two or more as the cellulosic fiber. Non-twisted yarn is preferred among the above-mentioned raw materials for both moldability and mechanical strength of the composite material.

Fiber Sheet

A fiber sheet refers to a sheet obtained by processing of a large number of filaments of fiber into a thin and wide sheet. Fiber sheets include woven fabric, knitted fabric, and nonwoven fabric.

Methods of weaving the cellulosic fiber are not particularly limited, and a general method can be used. Weaves of the woven fabric are not particularly limited either, and any of three foundation weaves, a plain weave, a twill weave, or a satin weave, may be used.

Gaps between warp yarns and between weft yarns of the cellulosic fiber in the woven fabric formed of the cellulosic fiber may range preferably from 0.1 to 0.8 mm, more preferably from 0.2 to 0.6 mm, and even more preferably from 0.25 to 0.5 mm. Furthermore, the woven fabric formed of the cellulosic fiber may have a mass per unit area ranging preferably from 50 to 500 g/m$^2$ and more preferably from 100 to 400 g/m$^2$.

Setting the gaps and the mass per unit area of the cellulosic fiber and the woven fabric formed of the cellulosic fiber in the above ranges enables carbon fiber woven fabric obtained by heat treatment of the woven fabric to have excellent strength.

Methods of manufacturing the nonwoven fabric are also not particularly limited. Examples of the methods may include: a method where a fiber sheet is obtained by use of a dry method or a wet method with the above-mentioned fiber serving as a raw material and having been cut into appropriate lengths; and a method where a fiber sheet is directly obtained from a solution by use of an electrospinning method. After the nonwoven fabric is obtained, treatment, such as resin bonding, thermal bonding, spun lacing, or needle punching, may be added for the purpose of bonding the filaments of fiber together.

3-2. Catalyst

According to Embodiment 1 of manufacturing method, a catalyst is held by the raw material sheet prepared as described above. The raw material sheet holding the catalyst is carbonized and further activated by using gas, such as steam, carbon dioxide, or air gas, and a porous activated carbon fiber sheet is thus able to be obtained. Examples of the catalyst that may be used include a phosphoric acid-based catalyst and an organic sulfonic acid-based catalyst.

Phosphoric Acid-Based Catalyst

Examples of the phosphoric acid-based catalyst may include: oxyacids of phosphorus, such as phosphoric acid, metaphosphoric acid, pyrophosphoric acid, phosphorous acid, phosphoric acid, phosphorous acid, and phosphinic acid; ammonium dihydrogen phosphate, diammonium hydrogen phosphate, triammonium phosphate, dimethyl phosphono propanamide, ammonium polyphosphate, and polyphosphonitrile chloride; and condensation products between: phosphoric acid, tetrakis (hydroxymethyl) phosphonium salt, or tris (1-aziridinyl) phosphine oxide; and urea, thiourea, melamine, guanine, cyanamide, hydrazine, dicyandiamide, or a methylol derivative of any one of these. Preferable examples may include diammonium hydrogen phosphate. One kind of phosphoric acid-based catalysts may be used alone or two or more kinds of phosphoric acid-based catalysts may be used in combination. When the phosphoric acid-based catalyst is used in the form of an aqueous solution, the phosphoric acid-based catalyst in the aqueous solution may have a concentration ranging preferably from 0.05 to 2.0 mol/L and more preferably from 0.1 to 1.0 mol/L.

Organic Sulfonic Acid-Based Catalyst

An organic compound having one or more sulfo groups can be used as the organic sulfonic acid. For example, a compound in which a sulfo group is bonded to any of various carbon skeletons of aliphatic series or aromatic series can be used. A preferred organic sulfonic acid-based catalyst has a low molecular weight in terms of handling of the catalyst.

Examples of the organic sulfonic acid-based catalyst may include compounds represented by R—$SO_3H$ where: R is a linear or branched alkyl group having 1 to 20 carbon atoms, a cycloalkyl group having 3 to 20 carbon atoms, or an aryl group having 6 to 20 carbon atoms; and each of the alkyl group, the cycloalkyl group and the aryl group optionally has a substituent of an alkyl group, a hydroxyl group, or a halogen group. Examples of the organic sulfonic acid-based catalyst may include methanesulfonic acid, ethanesulfonic acid, propanesulfonic acid, 1-hexanesulfonic acid, vinylsulfonic acid, cyclohexanesulfonic acid, p-toluenesulfonic acid, p-phenolsulfonic acid, naphthalenesulfonic acid, benzenesulfonic acid, and camphorsulfonic acid. Methanesulfonic acid may be preferably used among these examples. One kind of these organic sulfonic acid-based catalysts may be used alone, or two or more kinds of these organic sulfonic acid-based catalysts may be used in combination.

When the organic sulfonic acid is used in the form of an aqueous solution, the organic sulfonic acid in the aqueous solution may have a concentration ranging preferably from 0.05 to 2.0 mol/L and more preferably from 0.1 to 1.0 mol/L.

Mixed Catalyst

The above-mentioned phosphoric acid-based catalyst and organic sulfonic acid-based catalyst may be mixed and used as a mixed catalyst. The mixing ratio may be adjusted as appropriate.

Holding of Catalyst

The catalyst is held by the raw material sheet. "Being held" means that the catalyst is kept in contact with the raw material sheet, and the catalyst may be held in various forms through, for example, adhesion, adsorption, or impregnation. Methods for the catalyst to be held by the raw material sheet are not particularly limited and include, for example, a method of immersing the raw material sheet in an aqueous solution containing the catalyst, a method of sprinkling an aqueous solution containing the catalyst over the raw material sheet, a method of allowing the raw material sheet to be in contact with vapor of the catalyst that has been vaporized, and a method of mixing the fiber of the raw material sheet into an aqueous solution containing the catalyst to make paper.

A method that can be preferably used for sufficient carbonization is a method of immersing the raw material sheet in an aqueous solution containing the catalyst to impregnate the fiber with the catalyst so that the catalyst reaches the inside of the fiber. The temperature for the immersion in the aqueous solution containing the catalyst is not particularly limited and may preferably be room temperature. The immersion time may range preferably from 10 seconds to 120 minutes and more preferably from 20 seconds to 30 minutes. The immersion allows the fiber forming the raw material sheet to adsorb, for example, 1 to 150% by mass and preferably 5 to 60% by mass, of the catalyst. After the immersion, the raw material sheet is preferably taken out from the aqueous solution and dried. A method of drying the raw material sheet may be, for example, any of methods including a method of leaving the raw material sheet at room temperature or putting the raw material sheet in a dryer. The drying may be performed until the sample no longer changes in weight by evaporation of excess moisture after the sample is removed from the aqueous solution containing the catalyst. For example, in the drying at room temperature, the drying time for which the raw material sheet is left may be 0.5 days or more. When the raw material sheet holding the catalyst almost no longer changes in mass because of the drying, the raw material sheet holding the catalyst proceeds to the step to be carbonized.

3-3. Carbonization Treatment

After the raw material sheet holding the catalyst has been prepared, it is subjected to carbonization treatment. The carbonization treatment for obtainment of the activated carbon fiber sheet may be performed according to a general method of carbonizing activated carbon. The carbonization treatment according to a preferred embodiment may be performed as follows.

The carbonization treatment is usually performed under an inert gas atmosphere. According to the present invention, the inert gas atmosphere means an oxygen-free or low-oxygen atmosphere in which carbon is difficult to undergo a combustion reaction and is thus carbonized. The inert gas atmosphere may preferably be an atmosphere including gas, such as argon gas or nitrogen gas.

The raw material sheet holding the catalyst is subjected to heat treatment and carbonized in the given gas atmosphere mentioned above.

The lower limit of the heating temperature may be preferably 300° C. or higher, more preferably 350° C. or higher, and even more preferably 400° C. or higher or 750° C. or higher.

The upper limit of the heating temperature may be preferably 1400° C. or lower, more preferably 1300° C. or lower, and even more preferably 1200° C. or lower or 1000° C. or lower.

Setting the heating temperature as described above enables obtainment of a carbon fiber sheet with its fiber form maintained. If the heating temperature is lower than the above-mentioned lower limit, the carbon fiber may have a carbon content of 80% or less and carbonization may thus be insufficient.

The lower limit of the heat treatment time including the time for the temperature to rise may be preferably 10 minutes or more, more preferably 11 minutes or more, even more preferably 12 minutes or more, and still even more preferably 30 minutes or more.

The upper limit of the heat treatment time may be optional, but may be preferably 180 minutes or less, more preferably 160 minutes, and even more preferably 140 minutes or less.

By sufficiently impregnating the raw material sheet with the catalyst, setting the above-mentioned suitable heating temperature, and adjusting the heat treatment time, it is possible to adjust the degree of progress of pore formation and thus adjust the physical properties of the porous body, such as the specific surface area, the volume of the various pores, and the average pore diameter.

If the heat treatment time is shorter than the above lower limit, carbonization tends to be insufficient.

Furthermore, the heat treatment can include further reheating treatment under a given gas atmosphere after the above-described heat treatment (which may be referred to as primary heat treatment). That is, the carbonization treatment may be performed by dividing the heat treatment into two or more stages having different conditions, such as different temperatures. By performing the primary heat treatment and the reheating treatment under predetermined conditions, it may be possible to adjust the physical properties, promote the carbonization and the subsequent activation, and thus obtain an activated carbon fiber sheet having excellent adsorption and desorption properties.

3-4. Activation Treatment

The activation treatment according to the present invention may be, for example, performed continuously after the above-described heat treatment, by providing steam and keeping an appropriate activation temperature for a predetermined time, and the activated carbon fiber sheet is thereby able to be obtained.

The lower limit of the activation temperature may be preferably 300° C. or higher, more preferably 350° C. or higher, and even more preferably 400 or 750° C. or higher.

On the other hand, the upper limit of the activation temperature may be preferably 1400° C. or lower, more preferably 1300° C. or lower, and even more preferably 1200 or 1000° C. or lower.

When the activation treatment is performed continuously after the heat treatment, the activation temperature is preferably adjusted to a temperature that is almost the same as the heating temperature.

The lower limit of the activation time may be preferably one minute or more, and more preferably five minutes or more.

The upper limit of the activation time may be optional, but may be preferably 180 minutes or less, more preferably 160 minutes or less, and even more preferably 140 minutes or less, 100 minutes or less, 50 minutes or less, or 30 minutes or less.

EXAMPLES

Hereinafter, the present invention will be described more specifically with reference to examples, but the technical scope of the present invention is not limited to the following examples.

Various items related to physical properties and performance of activated carbon fiber sheets and granular activated carbon were measured and evaluated by methods described below. Various numerical values defining the present invention are able to be determined by the following measurement methods and evaluation methods.

Specific Surface Area

About 30 mg of an activated carbon fiber sheet were collected, vacuum-dried at 200° C. for 20 hours, weighed, and measured using a high-precision gas/vapor adsorption amount measuring apparatus BELSORP-MAX II (MicrotracBEL Corp.). The adsorption amount of nitrogen gas at the boiling point of liquid nitrogen (77 K) was measured at a relative pressure ranging from the $10^{-8}$ order to 0.990, and an adsorption isotherm of the sample was thereby prepared. This adsorption isotherm was analyzed by the BET method for which the relative pressure range for analysis had been automatically determined under the conditions of the adsorption isotherm of Type I (ISO 9277), and the BET specific surface area per weight (unit: $m^2/g$) was determined as a specific surface area (unit: $m^2/g$).

Total Pore Volume

The total pore volume (unit: $cm^3/g$) by a one-point method was calculated based on the result at the relative pressure of 0.990 on the adsorption isotherm obtained according to the above description related to the specific surface area.

Average Pore Diameter

Calculation was performed by use of Equation 3 below.

$$\text{Average pore diameter (unit: nm)} = 4 \times \text{total pore volume} \times 10^3 / \text{specific surface area} \quad \text{(Equation 3)}$$

Ultramicropore Volume

The adsorption isotherm obtained according to the above description related to the specific surface area was analyzed using the analysis software BELMaster pertaining to the high-precision gas/vapor adsorption amount measuring apparatus BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore diameter: Solid and Fluid Def. Pore Size," and "Kernel: Slit-C-Adsorption." The integrated pore volume at 0.7 nm was read from the obtained pore distribution curve for adsorption, the integrated pore volume serving as the ultramicropore volume (unit: $cm^3/g$).

Micropore Volume

The adsorption isotherm obtained according to the above description related to the specific surface area was analyzed using the analysis software BELMaster pertaining to the high-precision gas/vapor adsorption amount measuring apparatus BELSORP-MAX II (MicrotracBEL Corp.) through the GCMC method with the analysis settings set as follows: "Smoothing (moving average processing using one point each before and after every analyzed point of the pore distribution)," "Distribution function: No-assumption," "Definition of pore diameter: Solid and Fluid Def. Pore Size," and "Kernel: Slit-C-Adsorption." The integrated pore volume at 2.0 nm was read from the obtained pore distribution curve for adsorption, the integrated pore volume serving as the micropore volume (unit: $cm^3/g$).

Basis Weight of Sheet

After the activated carbon fiber sheet was allowed to stand for 12 hours or more under the environment where the temperature was 23±2° C. and the relative humidity was 50±5%, the basis weight (unit: $g/m^2$) of the sheet was determined from the weight and the lengthwise and widthwise dimensions of the sheet.

Thickness of Sheet

The activated carbon fiber sheet was allowed to stand for 12 hours or more under the environment where the temperature was 23±2° C. and the relative humidity was 50±5%, and the thickness of the sheet was then measured by use of a small digital thickness measuring device FS-60DS (Daiei Kagaku Seiki Mfg. Co., Ltd.) with a load of 0.3 KPa applied to the sheet.

Density of Sheet

Calculation was performed by use of Equation 4 below.

$$\text{Density of sheet (unit: g/cm}^3\text{)=basis weight of sheet÷thickness of sheet÷}10^3 \quad \text{(Equation 4)}$$

Tensile Strength (MD) and Tensile Strength (CD)

The activated carbon fiber sheet was allowed to stand for 12 hours or more under the environment where the temperature was 23±2° C. and the relative humidity was 50±5%. Test pieces (each with a width of 15 mm and a length 50 to 60 mm) were then cut out from the sheet along Machine Direction (MD) or Cross Direction (CD) being orthogonal to Machine Direction (MD) so that lengths of the test pieces were respectively along Machine Direction and along Cross Direction. Using a Tensilon universal testing instrument RTG-1210 (A & D Co. Ltd.), the test pieces were pulled with the length between grips at 40 mm and the pulling speed at 100 ram/min. The tensile strength was respectively calculated by Equations 5 below.

$$\text{Tensile strength (unit: kN/m)=maximum load (unit: N) applied during test÷15 mm} \quad \text{Equation 5}$$

Moisture Content

The activated carbon fiber sheet was allowed to stand for 12 hours or more under the environment where the temperature was 23±2° C. and the relative humidity was 50±5%, a sample of 0.5 to 1.0 g was thereafter collected from the sheet and dried at 115±5° C. for three hours or more in a dryer, and moisture (unit: %) was determined from change in weight of the dried sample.

Methylene Blue Adsorption Performance

Measurement according to methylene blue decolorizing power (unit: ml/g) of powdered activated carbon for water supply conforming to Japan Water Works Association standards (JWWA K113) was performed, and results of the measurement were determined as the methylene blue adsorption performance (unit: ml/g).

N-Butane Adsorption-Desorption Performance

With reference to the American Society for Testing and Materials Standard Test Method for Determination of Butane Working Capacity of Activated Carbon (ASTM D5228-16), the concentration and flow rate of n-butane gas and the flow rate of air to be desorbed were originally set and tests were performed.

Adsorbent samples were dried in a dryer at 115±5° C. for at least 3 hours and dry weight was measured after cooling. The mass of an empty test tube (glass tube with an inner diameter of 1.47 cm, a cross-sectional area of 1.67 cm², a sample filling length of 10 cm, and a sample filling volume of 16.7 ml) was measured, and then an adsorbent sample was filled into the adsorption tube until 16.7 ml. The active carbon fiber sheet, for example, was cut so as to be sheet thickness×length 10 cm×width=16.7 ml, rolled up and filled.

Then, the test tube was placed in the distribution system and 500 ml/min of n-butane gas diluted to 0.2% concentration with air was flowed through the test tube at test temperature of 25° C. to adsorb n-butane. The test tube was removed from the distribution system and its mass was measured. This flow of 0.2% concentration n-butane gas was repeated until a constant mass was achieved, that is, until its adsorbed amount was saturated.

The test tube was reinstalled in the distribution system and 4.0 L/min of air was flowed through the test tube for 3 minutes and 48 seconds at a test temperature of 25° C. to desorb n-butane. The test tube was removed from the distribution system and its mass was measured.

This adsorption and desorption operation was repeated twice in total, and a first adsorption amount, an effective adsorption-desorption amount, and an effective adsorption-desorption rate were calculated using the following equations 6, 7, and 8.

$$\text{First adsorption amount=First n-butane adsorption amount÷Dry weight of adsorbent sample×100} \quad \text{Equation 6}$$

The units of each value are as follows.
First adsorption amount (unit: wt %)
Amount of n-butane adsorbed for the first time (unit: g)
Dry weight of adsorbent sample (unit: g)

$$\text{Effective adsorption-desorption amount=(Second n-butane adsorption amount+Second n-butane desorption amount)÷2÷Dry weight of absorbent sample×100} \quad \text{Equation 7}$$

The units of each value are as follows.
Effective adsorption-desorption amount (unit: wt %)
Second n-butane adsorption amount (unit: g)
Second n-butane desorption amount (unit: g)
Dry weight of adsorbent sample (unit: g)

$$\text{Effective adsorption-desorption rate=Effective adsorption-desorption amount÷First adsorption amount×100} \quad \text{Equation 8}$$

The units for each value are as follows.
Effective adsorption-desorption rate (unit: %)
Effective adsorption-desorption amount (unit: wt %)
First adsorption amount (unit: wt %)

Example 1

A needle-punched nonwoven fabric made of rayon fiber (at 1.7 dtex) and having a basis weight of 300 g/m² was impregnated with 6 to 10% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 50 minutes, and was kept at this temperature for 4 minutes. Continuously at that temperature, activation treatment was performed for 18 minutes in a nitrogen gas stream containing steam with a dew point of 71° C.

Example 2

An activated carbon fiber sheet of Example 2 was prepared in the same manner as that in Example 1, except that a needle-punched nonwoven fabric made of rayon fiber (at 7.8 dtex) and having a basis weight of 300 g/m² was used.

Example 3

An activated carbon fiber sheet of Example 3 was prepared in the same manner as that in Example 1, except that a needle-punched nonwoven fabric made of rayon fiber (at 3.3 dtex) and having a basis weight of 300 g/m² was used.

Comparative Example 1

An activated carbon fiber sheet of Comparative Example 1 was prepared in the same manner as that in Example 3, except that the temperature rising time to 900° C. was changed to 25 minutes, the time in which the temperature was kept at 900° C. was changed to 2 minutes, the activation treatment time was changed to 6 minutes, and a dew point was changed to 60° C., from those in Example 2.

Comparative Example 2: Granular Activated Carbon

Granular activated carbon filling a commercially available canister was taken out and used as an adsorbent of Comparative Example 2.

The commercially available canister used was a canister having a product number of 14950-01FOA (by Nissan Motor Corporation).

Results of measurement of physical properties and performance for Examples 1 to 3 and Comparative Examples 1 and 2 are listed in Table 1.

TABLE 1

Measurement Results

| Class | | | Example 1 ACF | Example 2 ACF | Example 3 ACF | Comparative Example 1 ACF | Comparative Example 2 Granular activated carbon for canister | Reference Standards or Analysis Method |
|---|---|---|---|---|---|---|---|---|
| Precursor | | | Rayon fiber 1.7 dtex | Rayon fiber 7.8 dtex | Rayon fiber 3.3 dtex | Rayon fiber 3.3 dtex | — | |
| $N_2$ adsorption BET analysis | Specific surface area | m²/g | 2090 | 1870 | 2130 | 1160 | 1460 | JIS K 1477 |
| | Total pore volume | cm³/g | 0.97 | 0.84 | 0.99 | 0.49 | 1.05 | Basic physical |
| | Average pore diameter | nm | 1.85 | 1.80 | 1.85 | 1.68 | 2.88 | properties related to adsorption performance |
| $N_2$ adsorpton GCMC analysis | a) Ultramicropore volume[1] | cm³/g | 0.15 | 0.16 | 0.15 | 0.33 | 0.13 | Simulation analysis: Grand Canonical |
| | b) Micropore volume[2] | cm³/g | 0.75 | 0.68 | 0.76 | 0.47 | 0.48 | Monte Carlo |
| | b)−a) | cm³/g | 0.59 | 0.52 | 0.61 | 0.15 | 0.35 | Method |
| | a)/b) | % | 20.8 | 23.1 | 19.9 | 68.8 | 26.2 | |
| Sheet Physical Property | Basis Weight | g/m² | 84.6 | 96.3 | 100.3 | 198 | — | |
| | Thickness | mm | 2.69 | 2.68 | 2.33 | 2.51 | — | |
| | Density | g/cm³ | 0.031 | 0.036 | 0.043 | 0.079 | 0.47 | |
| Sheet Physical Property | Tensile strength MD | kN/m | 0.05 | 0.09 | 0.12 | 0.17 | — | |
| | Tensile strength CD | | 0.01 | 0.03 | 0.18 | 0.17 | — | |
| Moisture (23° C., 50% RH) | | % | 4.0 | 4.1 | 4.3 | 27 | 28 | JIS K 1477 |
| Methylene blue adsorption performance | | ml/g | 330 | 300 | 190 | 80 | 0 | JIS K 1477, JWWA K 113 |
| 0.2% n-butane adsorption-desorption performance | First adsorption amount Effective adsorption-desorption amount[3] | Wt % | 14.50 | 14.71 | 13.84 | 10.54 | 4.81 | Reference: ASTM D5228 |
| | (Average of second and third) | | 8.77 | 7.25 | 5.86 | 3.17 | 1.20 | Reference: ASTM D522 |
| | Effective adsorption-desorption ratio[4] | % | 60.5 | 49.3 | 42.3 | 30.1 | 24.9 | Reference: ASTM D5228 |

[1] Pore diameter is 0.7 nm or less.
[2] Pore diameter is 2.0 nm or less.
[3] Average of 2nd adsorption amount and 2nd desorption amount
[4] (Effective adsorption-desorption amount/first adsorption amount) × 100 (%)

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An activated carbon fiber sheet, comprising:
   a specific surface area ranging from 1400 m²/g to 2300 m²/g;
   a pore volume $V_{0.7\text{-}2.0}$ that is a volume for pores having pore diameters larger than 0.7 nm and equal to or smaller than 2.0 nm, ranging 0.20 cm³/g to 0.70 cm³/g;
   an abundance ratio $R_{0.7/2.0}$ that is a ratio of a pore volume of micropores having pore diameters of 0.7 nm or less occupied in a pore volume of micropores having pore diameters of 2.0 nm or less, ranging from 13% to less than 25%, and
   a sheet density ranging from 0.020 g/cm³ to 0.200 g/cm³.

2. The activated carbon fiber sheet according to claim 1, wherein a total pore volume of the activated carbon fiber sheet ranges from 0.60 to 1.20 cm³/g.

3. The activated carbon fiber sheet according to claim 1, wherein the activated carbon fiber sheet is a carbonized product of cellulosic fiber.

4. A motor vehicle canister, comprising: the activated carbon fiber sheet according to claim 1.

5. The motor vehicle canister according to claim 4, wherein a total pore volume of the activated carbon fiber sheet ranges from 0.60 to 1.20 cm³/g.

6. The motor vehicle canister according to claim 4, wherein the activated carbon fiber sheet is a carbonized product of cellulosic fiber.

7. The activated carbon fiber sheet according to claim 1, wherein the activated carbon fiber sheet is used for a motor vehicle canister.

8. The activated carbon fiber sheet according to claim 1, wherein the activated carbon fiber sheet is stored in a chamber of a motor vehicle canister.

9. The activated carbon fiber sheet according to claim 1, wherein the abundance ratio $R_{0.7/2.0}$ ranges from 15% to less than 25%.

* * * * *